Feb. 4, 1930.  F. B. YINGLING  1,745,823
MULTICOLOR TILE ASSEMBLING AND PASTING MACHINE
Original Filed May 1, 1924  9 Sheets-Sheet 1

Feb. 4, 1930. F. B. YINGLING 1,745,823
MULTICOLOR TILE ASSEMBLING AND PASTING MACHINE
Original Filed May 1, 1924  9 Sheets-Sheet 3

INVENTOR
FRANK B. YINGLING
BY
Fenelon B. Brock
ATTORNEY

Feb. 4, 1930. F. B. YINGLING 1,745,823
MULTICOLOR TILE ASSEMBLING AND PASTING MACHINE
Original Filed May 1, 1924 9 Sheets-Sheet 4

F. B. Yingling
INVENTOR

Fenelon B. Brock
ATTORNEY

Patented Feb. 4, 1930

1,745,823

UNITED STATES PATENT OFFICE

FRANK B. YINGLING, OF HAMILTON, OHIO

MULTICOLOR TILE ASSEMBLING AND PASTING MACHINE

Original application filed May 1, 1924, Serial No. 710,383. Divided and this application filed April 5, 1926, Serial No. 99,940. Renewed June 24, 1929.

The subject matter involved in this application for patent is a division of the invention disclosed in my prior application for patent Serial No. 710,383, filed May 1, 1924.

The present invention involving a multi-color tile assembling and pasting machine is designed especiallly for the purpose of forming mosaic patterns having different colored or contrasting tile incorporated therein, and pasting the assembled tile of the pattern on a sheet, which sheet may be of paper.

By the utilization of the machine of my invention, the tile of contrasting color can be deposited in the form of a base pattern having a primary color, in endless rows, singly, or in spaced groups, in the form of rosettes, in regular or irregular formations, and in numerous other relations for composing or carrying out predetermined definite patterns or mosaics.

The machine as illustrated is designed to assemble the tile in twelve rows, but it will be understood that a greater or less number of rows of tile may be assembled and pasted on a sheet and the machine is capable of alteration for this purpose without departing from the spirit of my invention.

The tile employed and automatically assembled by the machine may be of any desirable or suitable shape, but in the present exemplification of the invention they are of hexagonal shape and approximately one inch in dimensions between parallel sides. These tile are pasted upon sheets of suitable material, as paper, and the instrumentalities for producing the multi-colored effects in the completed sheet or pattern are hereinafter more particularly pointed out and claimed.

In my prior application for patent heretofore mentioned the machine there described and illustrated, and of which units in the present invention forms a part, is designed to feed, sort, elevate, convey, and assemble the tile in rows upon an assembling drum, and from said drum the pattern is automatically removed and pasted upon a carrier sheet or backing of paper. These paper sheets are cut from a strip or web before receiving the tile pattern, and after receiving the pattern the successive sheets with the tile pasted thereon are stacked in suitable formations, for subsequent use.

In the accompanying drawings I have illustrated two embodiments of my invention, one utilizing cross conveyers in a four color machine, and the other employing a machine of double deck and double width type with parallel conveyers, for forming a pattern of four colors.

It will be understood that a plurality of contrasting colors may be produced in the complete pattern, the colors embodied in the pattern ranging from two, upwardly, to various numbers, depending upon the number of units employed to deposit the tile upon the assembly drum.

For the purpose of producing the contrasting or different color-effects in the completed patterns, I utilize machinery and devices whereby voids are automatically created in the pattern that is being fashioned, and means are employed for automatically filling these voids by depositing contrasting tile therein. Means are also provided for governing the feed of the base tile and of the tile of contrasting color or colors with relation to other parts of the assembling and pasting mechanism, as will be described.

Figure 9 is an enlarged detail sectional view of the escapement mechanism at the left in Figure 7 for creating voids.

Figure 9$^a$ is a plan view at one edge of a part of the rotary assembling drum showing the formation of the tile pattern.

Figure 22:
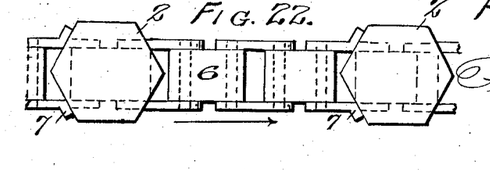
Figure 22 is a detail plan view of a portion of one of the main conveyer chains carrying two tile thereon.

In order that the general assembly and relation of parts of the machine may readily be understood, reference should first be had to Figures 1 through 4. In these figures of the drawing the hopper tile feeding devices are indicated as A and A′ from which the tile of primary or base color are fed, as in 12 rows to an inclined endless carrier B and deposited by said carrier in chutes C which chutes guide the rows of tile to the main endless conveyers D. This main conveyer mechanism, in the form of a suitable number of endless parallel chains (as seen in Fig. 22), carries the tile through a sorting machine, indicated as a whole by the letters E or E′ where the tile of undesirable size are eliminated from the stock carried by the main conveyer mechanism. The acceptable tile are selected by the sorting machine, restored to and conveyed on the main conveyer mechanism over an inspection table indicated at F and F′. An attendant inspects the moving tile as they pass over the table, eliminates any undesirable tile and corrects any undesirable conditions in the tile formation on the main conveyer mechanism. The rows of forwardly moving tile are then elevated by the flights G and G′ of the main conveyer to a suitable height as indicated. From this point the idle flights of the main conveyer mechanism return to the front portion or feed end of the machine at the left, and at this stage of the operations of the machine the tile of contrasting color or colors are introduced and associated or assembled in the pattern with the base color.

Figure 1:
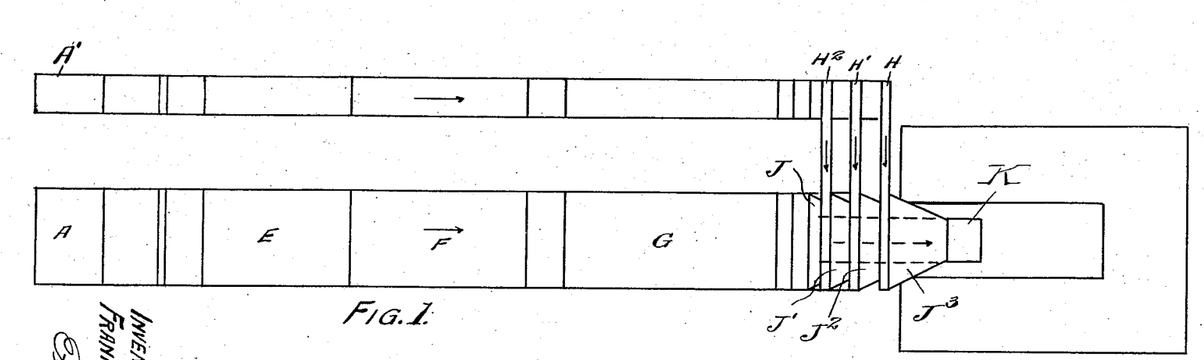
Figures 1 and 2 are, respectively, a top plan view and a side elevation of one type of machine embodying my invention wherein the tile of both the base color and of the contrasting color or colors are conveyed toward the rotary assembling drum in parallel lines and the contrasting tile are transferred to the assembling chutes by transversely disposed conveyers, the movement of parts being indicated by arrows in the figures of drawing.
Figures 2, 23:
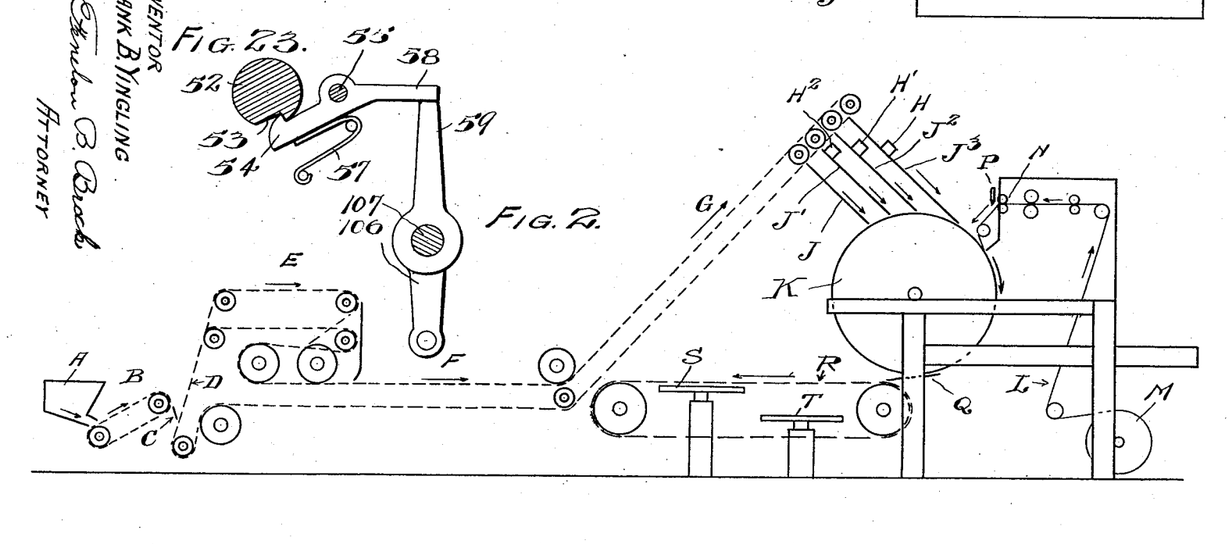
Figure 23 is a sectional detail view of the driving clutch for the cross conveyers.
Figure 3:
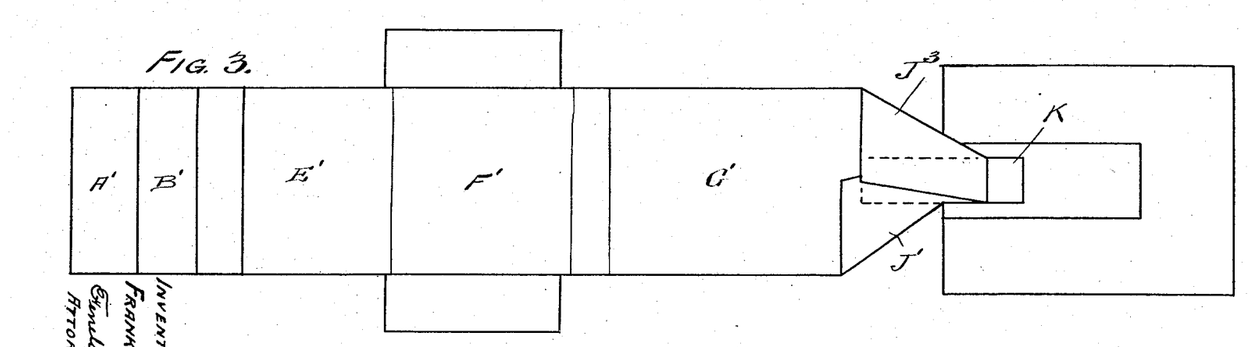
Figures 3 and 4 are, respectively, a top plan and side elevation of a multi-color tile assembling and pasting machine wherein a double-deck, double width lay-out is used and the tile of both the base color and contrasting color are conveyed longitudinally of the machine directly to the rotary assembling drum, the movement of parts being indicated by arrows as in Figures 1 and 2.
Figure 4:
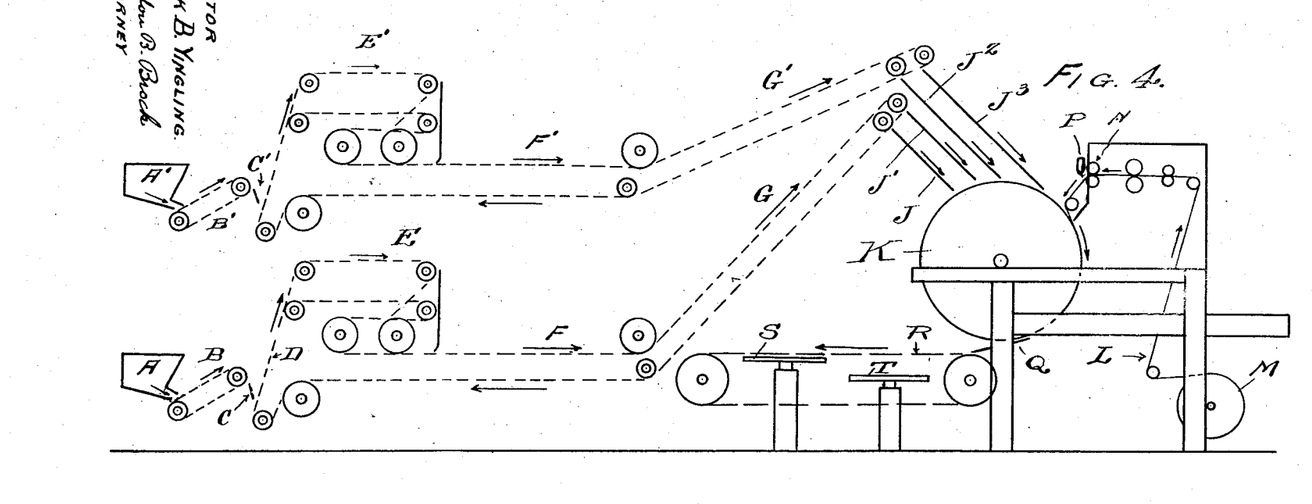

This assembly of the tile of contrasting color may be accomplished as in Figures 1 and 2 by the use of cross conveyers indicated as H, H′, and H². Or selected endless chains of the main conveyer (Fig. 22) may be utilized for feeding tile of contrasting color from hoppers as A′ to the multi-color conveyers in Figures 3 and 4.

In either event the base tile and contrasting tile, or primary tile and auxiliary tile as the case may be, are conveyed by chute mechanism indicated at J, J′, J², J³, to the rotary assembling drum K.

A web or strip of paper L is fed from roll

M and paste is applied thereto at N (Fig. 2) and the web is successively cut into sheets at P and these adhesive sheets are transferred and affixed to the exposed faces of the multicolored tile patterns as they pass around with the drum K to the guide Q which delivers the completed patterns to the endless conveyer R located below and in front of the drum.

From the conveyer R the sheets or completed patterns are deposited upon alternately acting, vertically reciprocating, stacking tables S and T.

The movement of the tile from the feed or hopper end of the machine to the pasting end, or stacking mechanism of the sheet is indicated by the arrows in Figures 1 to 4.

Figures 7, 8:
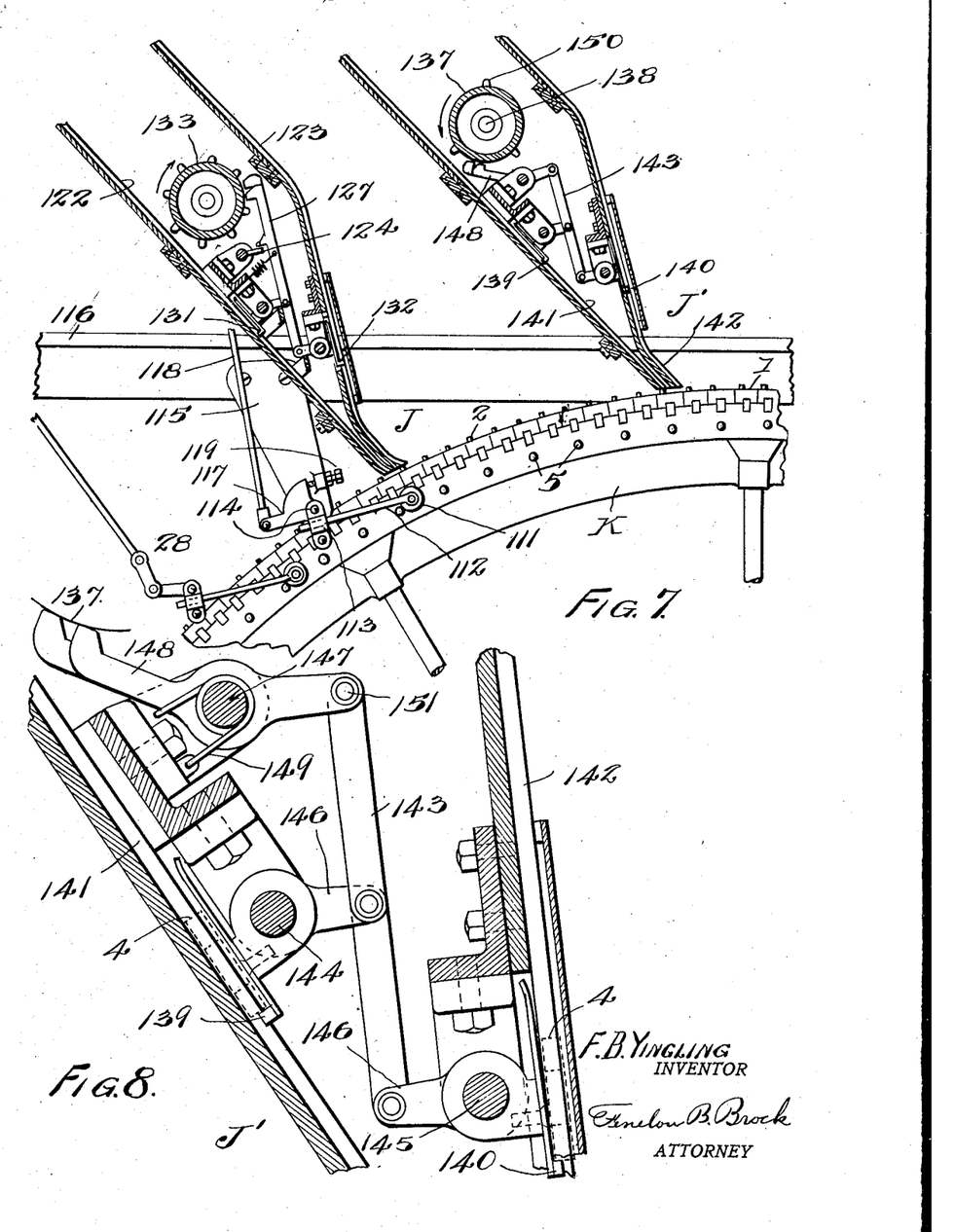
Figure 7 is a detail view showing a portion of the rotary assembling drum, with a pair of escapement devices shown in section within complementary storage delivery chutes, used to make and fill voids in the pattern being fashioned on the drum.
Figure 8 is an enlarged detail sectional view of the escapement mechanism as seen at the right in Figure 7 for dropping tile into the voids.
Figures 9, 9A:
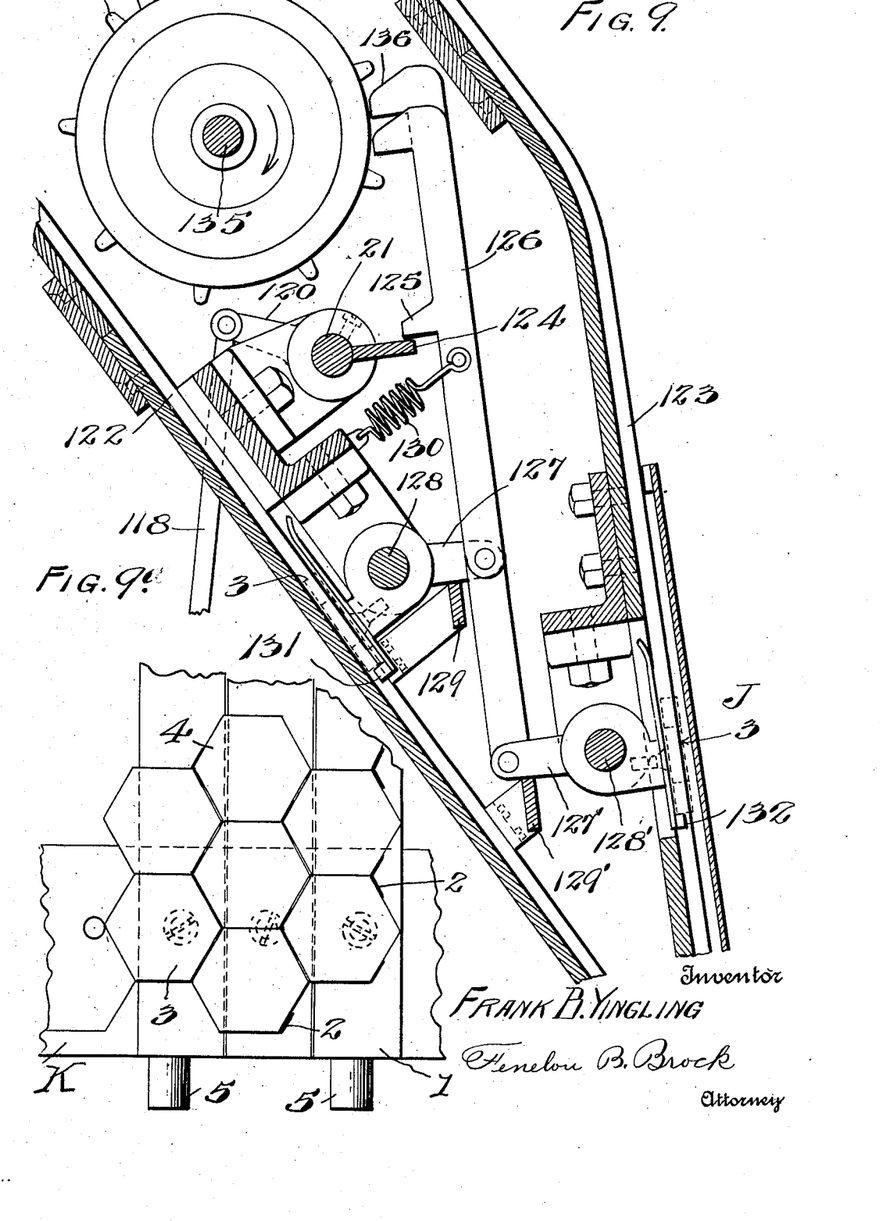

The rotary drum K as best seen in Figures 7 and 9$^a$ comprises cross bars 1 which are slotted in their outer faces to receive the sheet metal, angular spaced retaining clips 2 that project radially from the face of the drum to form pockets for the base tile 3, as well as for the contrasting color tile 4. On one side of the drum near its periphery is arranged an annular series of laterally projecting spaced pins 5, which as the drum revolves coact with and actuate control mechanism for the movement of the tile as will be described.

Figures 20, 21:
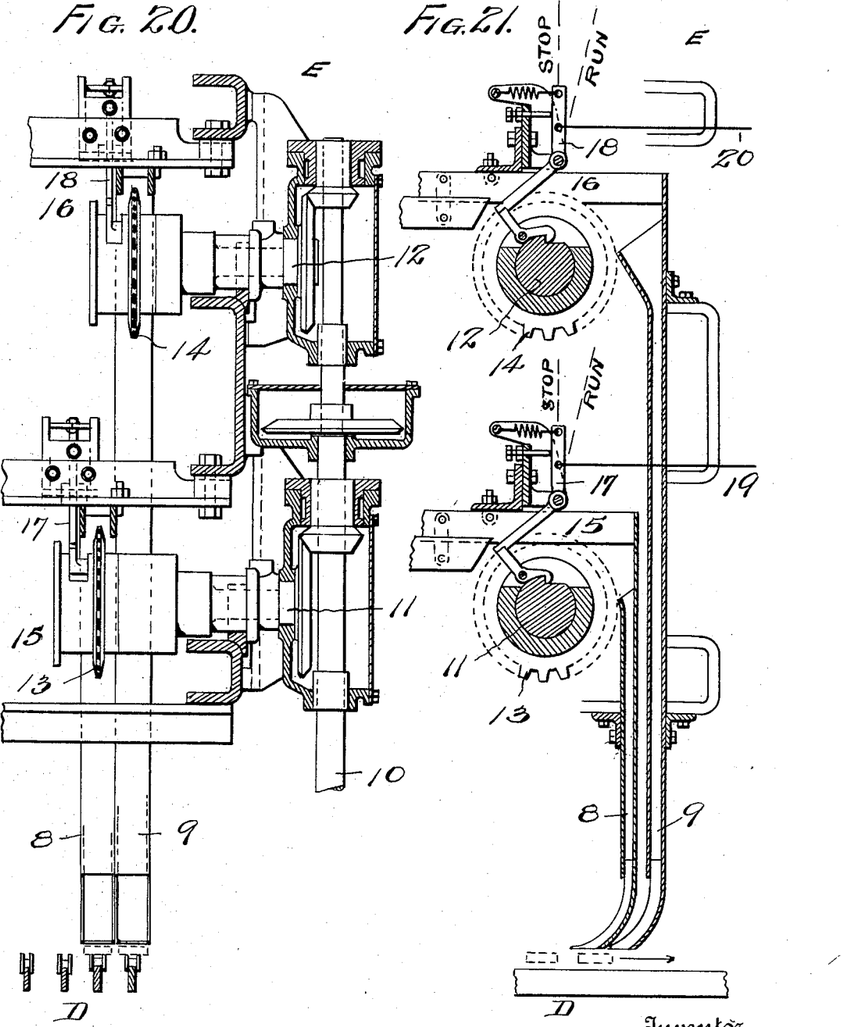
Figure 20 is a vertical sectional view of a portion of the sorting mechanism showing a vertical drive shaft and connections with the disengaging gear for the automatic watchman of Fig. 5.
Figure 21 is a vertical sectional view at right angles to that of Figure 20 indicating the wire connections to the mechanism of Figure 5.

The main conveyer mechanism comprises a series of parallel endless carrier chains as 6 in Figure 22 which are fashioned with carrier links 7 located at regular intervals for the tile. These carrier chains, twenty four in number as here shown, carry the rows of tile through the sorting mechanism of the machine indicated at E, which mechanism automatically removes the tile from the carrier chains, sorts the tile and selects the acceptable tile, and then automatically returns the selected tile through vertically arranged chutes as 8 and 9 (Figs. 20 and 21) to the carrier chains 6. The sorting mechanism is operated through a vertical drive shaft 10 which drives horizontal operating shafts as 11 and 12, and these latter shafts carry idle wheels 13 and 14 over which the tile successively fall from the chains to the gravity chutes 8 and 9. The lower backwardly curved discharge ends of the gravity chutes terminate just above the line of travel of the carrier chains. On the operating shafts 11 and 12 of the sorting device are provided throw off clutches or disengaging gears 15 and 16 respectively, (one for each of the twenty four carriers of the sorting mechanism) which act to clutch and unclutch the tile feed to the chutes 8 and 9 whenever any one or more of the storage delivery chutes J, etc. are full of tile. The clutches are provided with angular levers 17 and 18 to which operating wires 19 and 20 are connected, and these connections make it impossible to overstock the tiles in the storage chutes J. In Figures 20 and 21 these clutches are shown in "stop" position with relation to the two operating shafts 11 and 12 to prevent feed of tile to the gravity chutes 8 and 9, and the "run" positions of the levers 17 and 18 are also indicated in said figure of drawing.

Figures 5, 6:
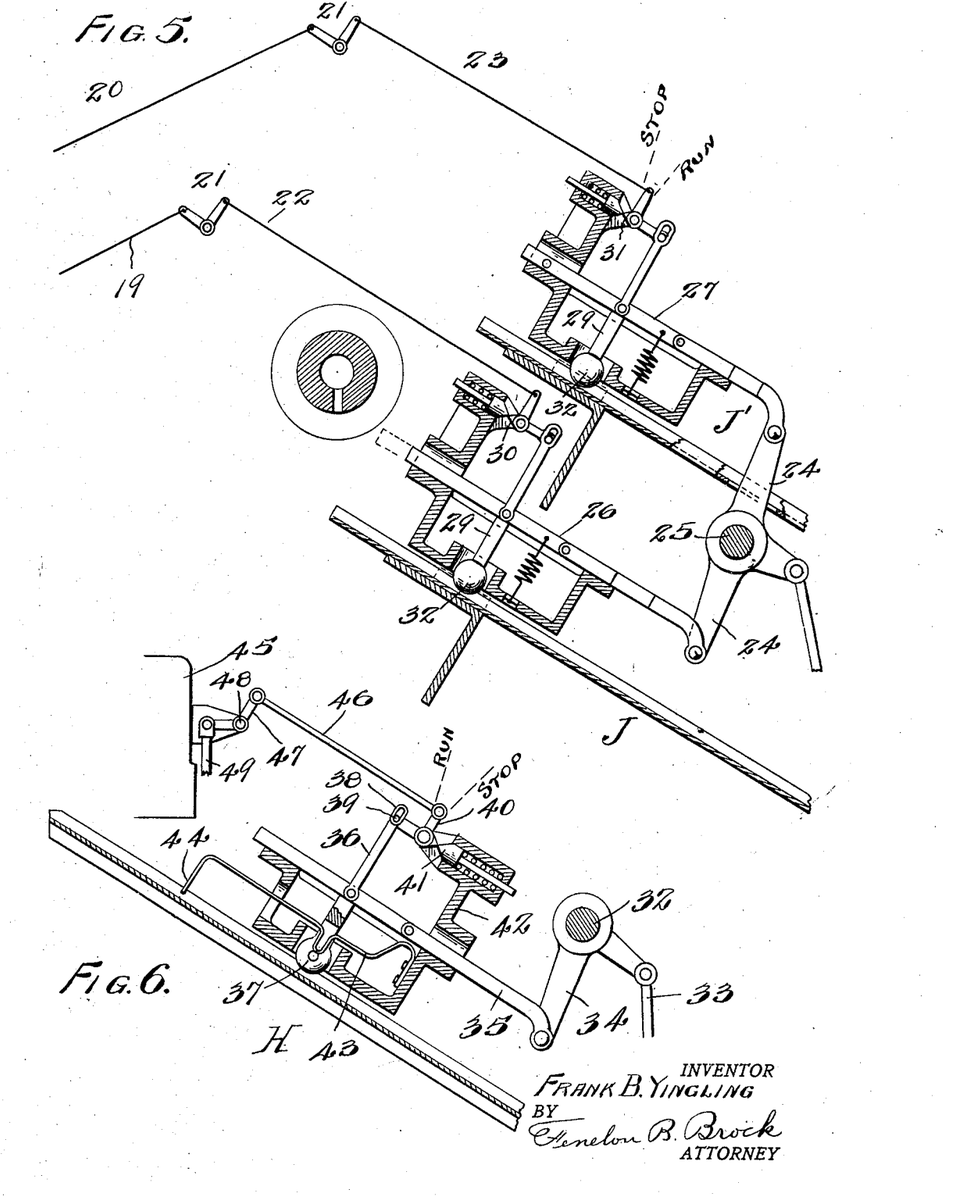
Figure 5 is a vertical, longitudinal sectional detail view at the upper ends of two of the storage, delivery chutes, showing a pair of automatic watchmen guarding the passage of tile therethrough to the rotary assembling drum, as illustrated in Figures 3 and 4.
Figure 6 is a vertical longitudinal sectional view at the upper end of one of the transfer or cross chutes for colored tile showing an automatic watchman for guarding the feed of colored tile to the storage-delivery chutes, as illustrated in Figure 1 and 2.

As shown in Figure 5 the ends of these wires 19 and 20 are connected to bell crank levers 21 pivoted in a suitable elevated portion of the frame of the machine, and these bell crank levers are connected by extension wires 22 and 23 to the control devices for delivering the tile to the storage chutes J, etc. These control devices which co-operate with the tile feed mechanism of Figures 20 and 21 to prevent overstocking the chutes J, do not influence the travel of the tile through the chutes J toward the assembling wheel.

In Figure 5 a double acting trip lever 24 for control of tile in both chutes J and J' is pivotally mounted on the rock shaft 25 for the purpose of operating slides 26 and 27 of the respective chutes. This rock shaft is actuated from the rotary assembling drum by successively moving pins 5, through the linkage 28 (Fig. 7) which is connected with the double arm lever 24. Connected to these slides are dependent ball levers 29 (which co-act with cataracts 30, 31) adapted to contact with any of the tile located in the chutes J and J'.

If no tile are present in the chutes, the balls 32 on the ends of the ball levers move up and down in the chutes and the slides 26 and 27 move idly back and forward through the linkage 28 as the assembling drum rotates without movement at the upper ends of the ball levers and also without movement of the cataracts. Consequently no corresponding actuation of the throw off clutches 15 and 16 or disengaging ears takes place in Figures 20 and 21. When, however, there are tile in the chutes, the dependent balls come in contact with the top surfaces of the tiles and are raised to elevate the slides 26 and 27. This movement swings the bell cranks of the cataracts 30 and 31 to stop position in Figure 5, and through the wire connections to the mechanism of Figure 21 the clutches are thrown to stop position shown, thus stopping the feed of the tile to the carrier chains of the main conveyer.

It will thus be seen that when the storage chute is full of tile and the strips are thrown out of clutches in Figures 20 and 21, the carrier chains stop and no more tile can enter the chute.

In Figure 6 an automatic watchman-detector is illustrated in connection with the cross conveyers for colored or contrasting tile, to ascertain whether the chutes are full or empty and to automatically control the feed of the tile to the chutes, H, etc.

Here the rock shaft 32 is located transversely of the machine adjacent to the rotary assembling drum K, and the pins 5 of the drum and linkage 33 actuated thereby transfer a rocking motion to the shaft and its rock arm 34. The reciprocating slide 35 which is pivoted to the rock arm 34 has a pivoted pendant lever 36 with a rounded or spherical, weighted head 37 thereon in the path of movement of the tile in the chute H. The upper end of the pendant lever is slotted as at 38 and a pin 39 on the bell crank lever 40 works loosely in the slot in connection with a cataract or spring pressed plunger device 41 which is supported in the frame 42.

The lever 36 above its contact head, is slotted to accommodate a flat spring 43 which is anchored at one end to the frame 42, with its bent, free end 44 adapted to form a detent for tile in the chute H in emergencies.

The cataract 41 for convenience of illustration, is shown in a neutral position, which position the bell crank lever cannot actually occupy, as it can assume only one or the other of the stop and run positions indicated on the figure of drawing, and the bell crank lever is designed to transmit movement to the cross conveyer within a housing 45, through the connecting rod 46, bell crank lever 47 which is pivoted at 48 on the exterior of the housing, and a vertically arranged link 49 pivotally suspended at one end of the lever 47.

Assuming the chute H to be empty, with the rounded or spherical end 37 of the lever 36 at its lowest point as indicated in Figure 6. With the drum K revolving, the spherical head is lifted to its highest position where it will clear the tile coming down the chute, and the bell crank lever 40 occupies the "run" position. While the parts are in this run position, the slotted end of the link 36 will travel up and down and impart an impulse to the bell crank 40, but no such an impulse as would be sufficient to throw the bell crank lever past the neutral position, because of the presence of the spring pressed plunger 41. Therefore when the chute H is empty the bell crank 40 will be seen to wobble a little, without passing the neutral point.

Now assuming that the chute H is filled with tile and the spherical head 37 of the link 36 is elevated to permit the flow of tile through the chute; when the end 37 begins to descend it comes in contact with the upper surface of a tile and further descent of the link is arrested. The continued movement of the slide 35 causes the slotted end 38 of the link to be elevated, which movement swings the bell crank lever 40 over to "stop" position and therefore, through the linkage 46, 47, 49 in Figure 6, stops the intermittent movement of the conveyer for colored tile.

Due to the lost motion of the slotted link 36 the automatic watchman-detector does not cramp or interfere with the tile as they slide or flow down the chute H, but should the remote possibility of the contact end or head 37 exactly meet a tile sliding down the chute (and thus accidentally throw the bell crank lever 40 to stop position) the tile would however be released on the next cycle of operation of the link 36.

For this purpose the spring-end 44 is designed to project into the path of movement of the tile in the chute, and this end of the spring moves at greater speed than the contact head to intercept the tile and block the tile in the chute for a period of sufficient duration to prevent the ball-head from meeting a tile.

The driving mechanism for intermittently moving the cross conveyers receives power from a suitable source on the machine, through driving sprocket 51 on the drive shaft 52 (Fig. 16) journaled in bearings on the top of the housing 45. At one end, (see Figs. 23 and 12) the shaft 52 is fashioned with a longitudinally extending, exterior groove or notch 53 with which a toothed clutch lever 54 is adapted to engage and revolve with the shaft. The clutch lever is pivoted at 55 on a sleeve 56 loosely carried on the shaft 52, and spring 57 carried by the sleeve is designed to hold the clutch lever in operative position and cause the sleeve to revolve with the shaft.

A tappet 58 is fixed rigid with the clutch lever 54 and projects through an opening in the hollow sleeve in position to be engaged by a release arm or detent 59.

An eccentric strap 60 is journaled on the exterior of the sleeve 56 and its rod 61 is pivoted to and operates a ring 62 on the end of the loose sleeve 63 carried by the transversely disposed operating shaft 64. On the end of the operating shaft a sprocket wheel 65 is keyed and fashioned with an internal ratchet 66 for co-action with a pawl 67 pivoted on the lever arm 68, which arm is carried by a hub 69 on the inner end of the sleeve 63.

By this arrangement of parts power is transmitted from the continuously rotating drive shaft 52 through the eccentric connections and the ratchet mechanism to the operating shaft for intermittently revolving the latter. The pawl 67 swings laterally in the internal ratchet and upon its working stroke, from right to left in Figure 11, the pawl through ratchet 66 imparts an intermittent movement to the operating sprocket wheel and the chain 70 passing around it. The lower or working flight of the chain passes longitudinally through the housing 45 and of course it is supported on a complementary wheel at the other end of the housing, or the end adjacent to the assembling drum.

The intermittently acting clutch mechanism thus imparts to the drag link chain 70 an intermittent movement which is approximately equal in duration to an alternating stationary or idle position of the chain. The colored tile are successively fed to the drag chain at the opposite end of the housing 45 from that shown in Figures 10, 11 and 12, from an escapement mechanism, not shown, but which may be similar to that illustrated in Figures 7 and 8.

Each alternating link 71 of the drag-link chain of the cross conveyers for colored tile is provided with a rigid arm 72 upon which a drag plate 73 is swiveled, and an angularly disposed, rigid, drag bar 74 is carried by the swiveled plate to drag or push the tile along. The lower or working flight of the chain is supported on pairs of flanged rollers 75 on the ends of transverse shafts 76 carried by the drag plates, and at the discharge end of the housing 45 these rollers travel along on the upper edges of a system comprising two sets of rails 77 disposed longitudinally of the housing, one set at each side thereof. At the discharge end of the housing these rails are located above the upper ends of the chutes H, H', H² etc. and extend transversely of the chutes as best seen in Figure 17.

Below the lower or working flight of the chain 70 within the open bottom of the housing 45 and co-acting with the two sets of rails 77, is a longitudinally disposed series of successively arranged, horizontal gates 78, each having an open bottom or central open-end slot 79, and each gate is pivoted on a transverse shaft 80 journaled in bearings in the opposite side walls of the housing 45. The gates are fashioned with side guide flanges or walls 81 spaced apart a sufficient distance to permit passage of a tile as it is dragged or pushed over the series of closed gates by the drag bar 74 of the chain 70, and the gates are capable of being swung open upwardly, as indicated by dotted lines in Figure 19 to permit a tile to fall through to one of the chutes as H.

This individual swinging or opening movement of the gates is accomplished from the vertical link 49 (Figs. 12, 17) which at its lower end is pivoted in a crank arm 80' fixed on the projecting end of the shaft 80 of the gate. It will be apparent that by depressing the link 49 the crank arm causes shaft 80 to rock and swing its gate to open position (dotted lines Fig. 19) for the purpose of permitting a tile to fall through the chain and gate-opening to the chute. The open end slots 79 of the gates are of sufficient width to permit the drag bars 74 of the chain to pass through an open gate.

Figures 13, 14, 15, 16, 17, 18:
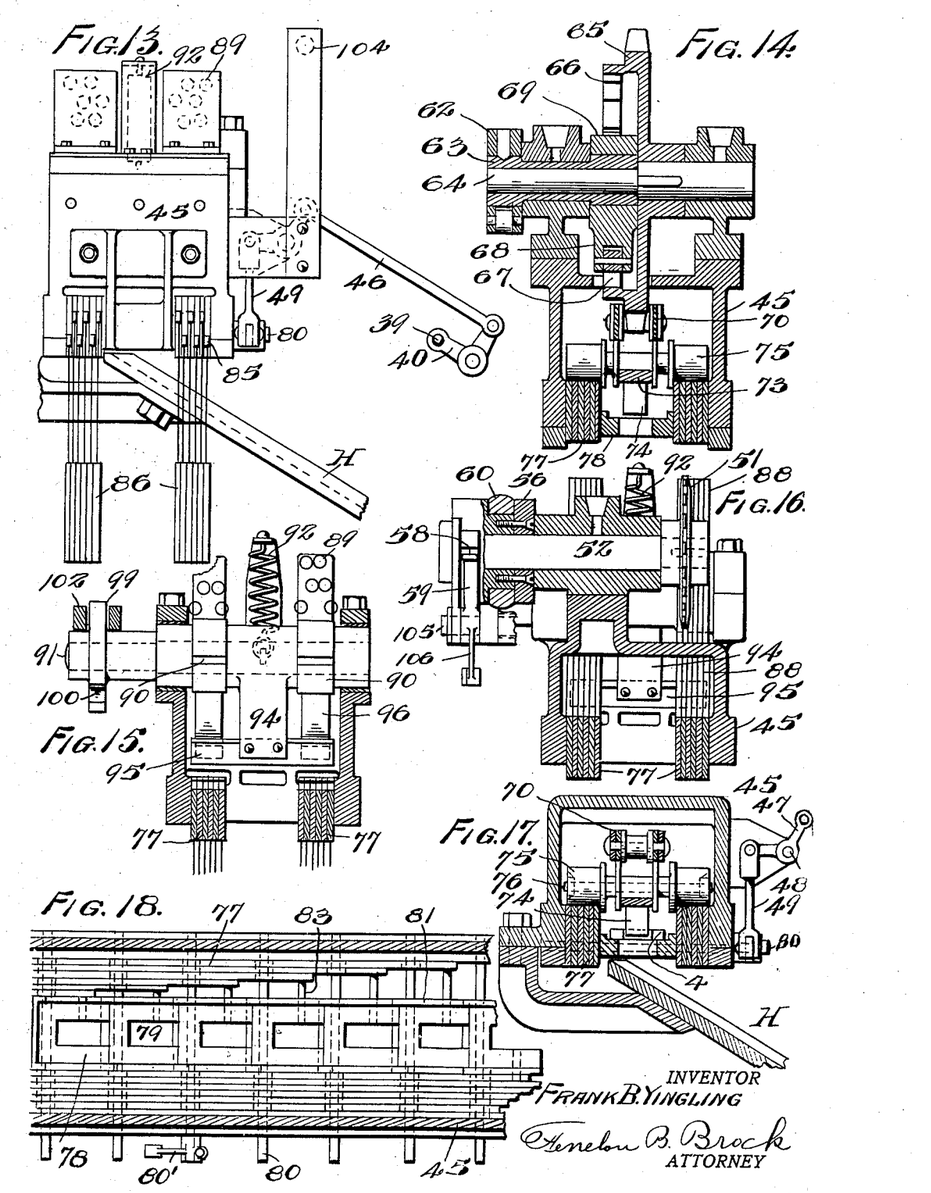
Figure 13 is an end view, as seen from the left in Figure 10.
Figure 14 is a vertical transverse sectional view at line 14—14 of Figure 10, illustrating the ratchet-wheel shaft of a cross conveyer operating mechanism.
Figure 15 is a transverse vertical sectional view at line 15—15 of Figure 10, with the rails and frame in section, and parts on the cam shaft in elevation.
Figure 16 is a transverse vertical sectional view at line 16—16 of Figure 10.
Figure 17 is a transverse vertical sectional view at line 17—17 of Figure 10 illustrating the relation of the rail system and feed chain of a cross conveyer to an angularly disposed storage-delivery chute leading to the assembling drum.
Figure 18 is a horizontal, longitudinal sectional view through one of the cross conveyers, disclosing portions of twelve rails and showing slotted delivery gates through which the tile pass when the gates are opened.
Figure 19:
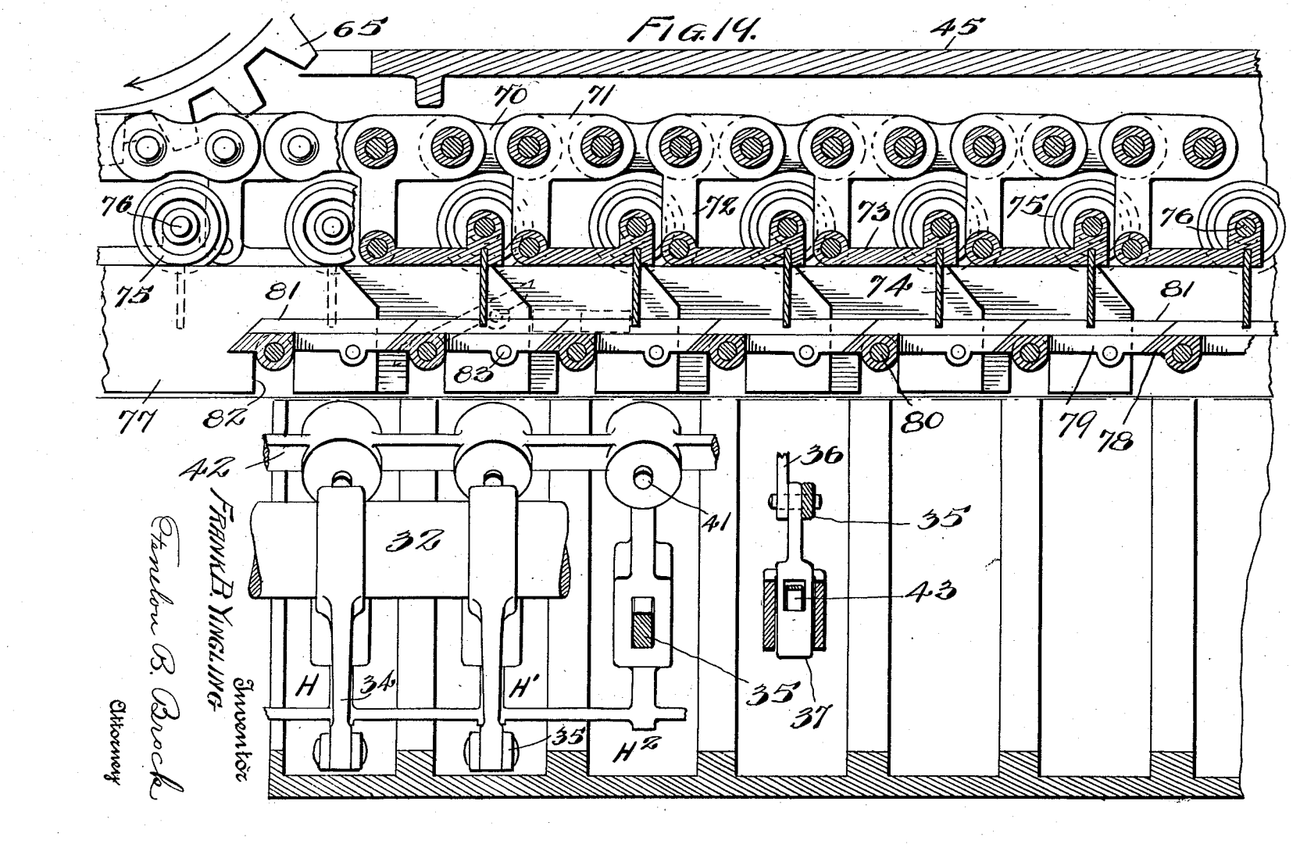
Figure 19 is an enlarged, detail, longitudinal, vertical sectional view of a portion of a cross conveyer showing the rail ends of a portion of the rail system, the drag chain for the colored tile in section, and some of the gates in section; together with a diagrammatic representation of parts of the storage-delivery chutes and automatic watchman mechanism.

As best seen in Figures 18 and 19 the row of gates is located between the two sets of rails 77 and each rail terminates at the side of a complementary gate. The six rails in the set at the near side of Fig. 18 are longer than the rails of the set at the far side, but the rails of the set at the near side also terminate at successive points adjacent to complementary gates in the row of gates.

Each rail near its end is fashioned with a vertical slot 82 in its lower edge to slip over a complementary rock-shaft 80 of a gate, and the rails have additional slots to slip over the other shafts 80, in order that all rails, when all gates are closed, present flush, level, upper edges or tracks over which the chain-rollers travel.

Each gate is connected to its complementary rail by means of a laterally extending pivot pin 83 which, as the gate is swung open, imparts a lifting movement to that end of the rail.

Figures 11, 12:
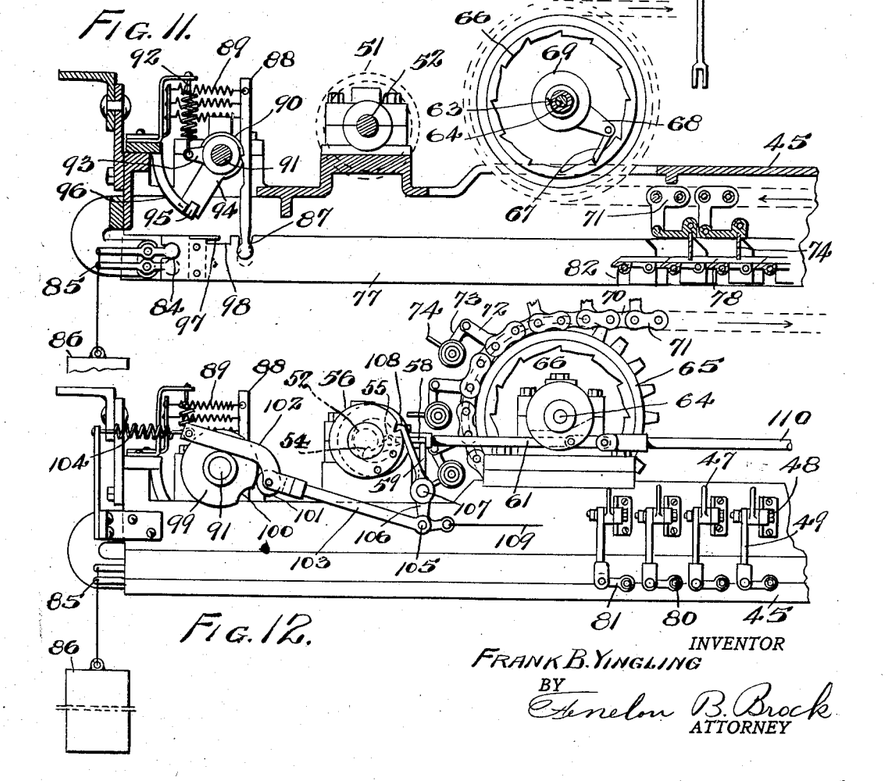
Figure 11 is a longitudinal, vertical sectional view at line 11 of Figure 10.
Figure 12 is a view in side elevation of the structure of Figure 10, showing the switch gear of the operating mechanism.

As seen in Figure 11 the rails are slotted and thereby pivotally suspended at 84 on levers 85 which levers are pivoted transversely of the housing 45, and counterbalancing weights 86 suspended from the levers are utilized to equalize the weight of the rails and permit facility in the swinging motion of the rails in a vertical plane.

Assuming that the chutes H, etc. are filled with tile, the automatic watchman of Figure 6 is in stop position, with the gates all closed, and rails of the two sets of the system in horizontal position with their upper edges flush to form tracks for the chain rollers. Under these conditions the ratchet-sprocket wheel 65 is idle and the drag chain remains stationary.

Figure 10:
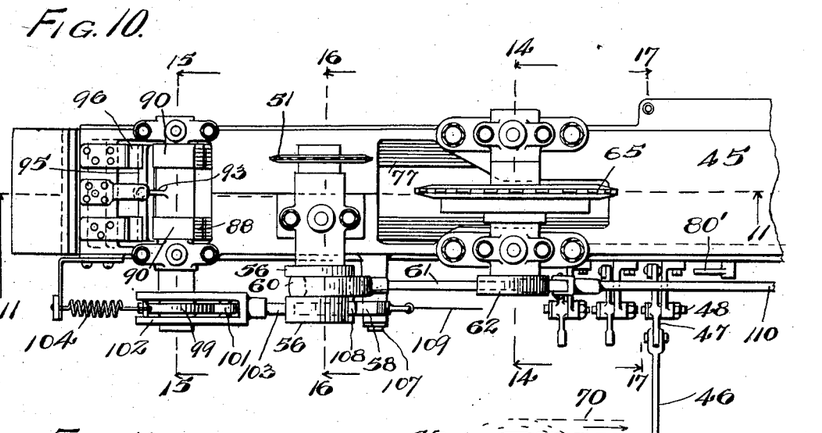
Figure 10 is a top plan view at the delivery end of a cross conveyer for transferring colored tile, showing the operating mechanism therefor.

Assuming now that one chute as H is being emptied of its tile, the automatic watchman of Figure 6 moves to "run" position and operates the rod 46 to rock a shaft 80 to open one of the gates 78. This opening movement of the gate actuates mechanism to close the drive clutch of the rotating drive shaft 52 in order to intermittently rotate the operating shaft as follows:—Near its pivot end each rail is notched on its upper edge at 87 for the pivotal reception of the lower end of an upright ratchet bar 88 having a single tooth. As seen in Fig. 10, the bars are arranged in two sets complementary to the two six-rail sets of the rail system and the toothed bars of each set are each held by a spring 89 against one of a pair of notched collars 90 spaced apart and carried on a transversely arranged cam shaft 91. The collars and shaft are urged to turn clockwise by means of a spring 92 attached to an arm 93 on the collar, and it will be apparent that the ratchet bars 88, when lifted by movement with a rail, will turn the collar and the shaft against the tension of spring 92.

As the cam shaft 91 is thus rocked or turned, a locking arm 94 having a single transversely disposed locking plate 95 on its free end swings down and to the right in Figure 11 from its abutment 96, and snaps over a spring locking-plate 97 on the upper edge of the raised rail 77, and drops into a locking notch 98 fashioned in the upper edge of the rail to retain the same in uplifted position.

The cam shaft 91 has a cam disk 99 secured thereon which is provided with a peripheral notch or depression 100 for co-action with a cam roller 101 carried by the yoke 102 of the cam bar 103. The yoke fits over the disk 99 and normally rests upon hubs of the cam disk, and a tension spring 104 is connected at the end of the yoke to hold the roller in contact with the edge of the disk. At 105 the cam rod 103 is pivoted to a crank arm 106 rigid with a pivot pin 107 journaled in bearings in the side of the housing 45 and this pin also carries the release lever 59 hereinbefore referred to.

Thus it will be obvious that as the rail is lifted, the cam disk is turned anti-clockwise until the roller 101 snaps into the notch 100 of the disk, stops the disk, pulls rod 103 and swings arm 106 to rock shaft 107 and swing detent 59 from beneath the arm 58 of the clutch lever. Under influence of its spring 57 the pawl 54 is swung into engagement with the notch 53 of the shaft 52 and the eccentric connecting rod is actuated to operate the shaft 64 and drag chain with its intermittent movement. A pawl 108 on shaft 107 is employed to engage and prevent back sliding of the sleeve 56 under influence of the spring 57 when power is disconnected.

By means of a wire 109 (Fig. 12) connected to the lever 106, a colored tile sorting-machine is also stopped whenever the drag link chain 70 stops. The other end of this wire is connected to a clutch mechanism for a sorting machine similar to that shown in Figures 20 and 21.

In Figures 10 and 12 a rod 110 is shown actuated from the ring 62 of the operating shaft for controlling the escapement mechanism of the base tile feed mechanism.

It will be understood that as many of the cross feed conveyers or drag-link chains may be used as is desired and while I have described the actuation and operation of only one chain, the devices for the other chains are of similar construction and operation.

When a gate (or gates) 78 is opened, and a rail (or rails) 77 is elevated the drag link chain 70 (or chains) of the cross conveying mechanism, is started on its intermittent movement. The chain (or chains) stops automatically when all of the twelve rails are in lowered horizontal position and all gates closed.

The colored or contrasting tile, and the base tile are fed to the assembly drum, either by parallel conveyers, or by the main conveyers and the cross conveyers co-acting therewith, through main assembling chutes, under the control of devices which are adapted to make voids in the base pattern being fashioned on the drum, and to fill said voids with the contrasting or colored tile.

In placing rosettes, odd, contrasting, or colored tile on the paper sheets or backing I first form voids in the pattern which voids are created through the instrumentality of a rotary selector device actuated from the rotary assembling drum and located transversely of the main feed chutes which deliver the tile to the drum.

In Figure 7 the escapement mechanism J at the left is for forming the base pattern, and for creating voids in the pattern as it is being fashioned on the assembling drum K, and the escapement mechanism J' at the right is for filling or dropping colored tile in the voids thus created.

The primary motion for operating the main escapement mechanism J is derived from the assembling drum K through the annular series of pins or pegs 5 which project laterally therefrom. The escapement actuating device as illustrated, comprises a roller 111 journaled at the end of a rod 112 which is adjustably held in a block 113 pivoted by means of the pin 114 in the bracket plate 115 secured to a frame part 11 of the machine. As the assembling drum revolves the contact of these successive pins or pegs 5 with the roller, causes the pivot pin to rock and this rocking motion is transmitted through a crank arm 117 to the reciprocating link 118, an adjustable stop screw 119 being provided to limit the movement of the crank arm. The link 118 is pivotally connected to a rock arm 120 on the shaft 121 of the main escapement mechanism, which shaft extends across the machine and operates the escapements in various main assembling double chutes 122 and 123 for assembling the base tile and forming the voids in the assembled pattern.

The shaft 121 is provided with a longitudinally extending blade 124 for co-action with a lug 125 on each of a series of escapement levers 126, pivotally supported within the chute on an arm as 127 and 127' on the rock shafts 128 and 128', and stationary brackets 129 and 129' which extend across the chutes, are employed to prevent excessive downward movement of the escapement levers.

Springs 130 attached to the levers normally hold them with their lugs 125 projecting over and resting upon the blade 124.

The trip mechanism for the tile, operated by the escapement levers, comprises pivoted gates or detents 131 and 132 on the respective shafts 128 and 128', which gates are interposed in the path of movement of the tile and are operated by the pins 5 of the assembling drum, one pin for each two spaces, or tiles, that are deposited on the assembling drum.

The voids in the pattern are created by the use of a rotary selector roll 133 having pins 134 thereon arranged in suitable numbers and spaced in predetermined relationship on the roll which revolves with its shaft 135 once for each pattern assembled. The pins 134 correspond in number with the voids to be created in the pattern for the colored tile. The selector pins 134 contact with beveled from that shown in Figures 10, 11 and 12, from an escapement mechanism, not shown, but which may be similar to that illustrated in Figures 7 and 8.

Each alternating link 71 of the drag-link chain of the cross conveyers for colored tile is provided with a rigid arm 72 upon which a drag plate 73 is swiveled, and an angularly disposed, rigid, drag bar 74 is carried by the swiveled plate to drag or push the tile along. The lower or working flight of the chain is supported on pairs of flanged rollers 75 on the ends of transverse shafts 76 carried by the drag plates, and at the discharge end of the housing 45 these rollers travel along on the upper edges of a system comprising two sets of rails 77 disposed longitudinally of the housing, one set at each side thereof. At the discharge end of the housing these rails are located above the upper ends of the chutes H, H', H² etc. and extend transversely of the chutes as best seen in Figure 17.

Below the lower or working flight of the chain 70 within the open bottom of the housing 45 and co-acting with the two sets of rails 77, is a longitudinally disposed series of successively arranged, horizontal gates 78, each having an open bottom or central open-end slot 79, and each gate is pivoted on a transverse shaft 80 journaled in bearings in the opposite side walls of the housing 45. The gates are fashioned with side guide flanges or walls 81 spaced apart a sufficient distance to permit passage of a tile as it is dragged or pushed over the series of closed gates by the drag bar 74 of the chain 70, and the gates are capable of being swung open upwardly, as indicated by dotted lines in Figure 19 to permit a tile to fall through to one of the chutes as H.

This individual swinging or opening movement of the gates is accomplished from the vertical link 49 (Figs. 12, 17) which at its lower end is pivoted in a crank arm 80' fixed on the projecting end of the shaft 80 of the gate. It will be apparent that by depressing the link 49 the crank arm causes shaft 80 to rock and swing its gate to open position (dotted lines Fig. 19) for the purpose of permitting a tile to fall through the chain and gate-opening to the chute. The open end slots 79 of the gates are of sufficient width to permit the drag bars 74 of the chain to pass through an open gate.

As best seen in Figures 18 and 19 the row of gates is located between the two sets of rails 77 and each rail terminates at the side of a complementary gate. The six rails in the set at the near side of Fig. 18 are longer than the rails of the set at the far side, but the rails of the set at the near side also terminate at successive points adjacent to complementary gates in the row of gates.

Each rail near its end is fashioned with a vertical slot 82 in its lower edge to slip over a complementary rock-shaft 80 of a gate, and the rails have additional slots to slip over the other shafts 80, in order that all rails, when all gates are closed, present flush, level, upper edges or tracks over which the chain-rollers travel.

Each gate is connected to its complementary rail by means of a laterally extending pivot pin 83 which, as the gate is swung open, imparts a lifting movement to that end of the rail.

As seen in Figure 11 the rails are slotted and thereby pivotally suspended at 84 on levers 85 which levers are pivoted transversely of the housing 45, and counterbalancing weights 86 suspended from the levers are utilized to equalize the weight of the rails and permit facility in the swinging motion of the rails in a vertical plane.

Assuming that the chutes H, etc. are filled with tile, the automatic watchman of Figure 6 is in stop position, with the gates all closed, and rails of the two sets of the system in horizontal position with their upper edges flush to form tracks for the chain rollers. Under these conditions the ratchet-sprocket wheel 65 is idle and the drag chain remains stationary.

Assuming now that one chute as H is being emptied of its tile, the automatic watchman of Figure 6 moves to "run" position and operates the rod 46 to rock a shaft 80 to open one of the gates 78. This opening movement of the gate actuates mechanism to close the drive clutch of the rotating drive shaft 52 in order to intermittently rotate the operating shaft as follows:—Near its pivot end each rail is notched on its upper edge at 87 for the pivotal reception of the lower end of an upright ratchet bar 88 having a single tooth. As seen in Fig. 10, the bars are arranged in two sets complementary to the two six-rail sets of the rail system and the toothed bars of each set are each held by a spring 89 against one of a pair of notched collars 90 spaced apart and carried on a transversely arranged cam shaft 91. The collars and shaft are urged to turn clockwise by means of a spring 92 attached to an arm 93 on the collar, and it will be apparent that the ratchet bars 88, when lifted by movement with a rail, will turn the collar and the shaft against the tension of spring 92.

As the cam shaft 91 is thus rocked or turned, a locking arm 94 having a single transversely disposed locking plate 95 on its free end swings down and to the right in Figure 11 from its abutment 96, and snaps over a spring locking-plate 97 on the upper edge of the raised rail 77, and drops into a locking notch 98 fashioned in the upper edge of the rail to retain the same in uplifted position.

The cam shaft 91 has a cam disk 99 secured thereon which is provided with a peripheral notch or depression 100 for co-action with a cam roller 101 carried by the yoke 102 of the cam bar 103. The yoke fits over the disk 99 and normally rests upon hubs of the cam disk, and a tension spring 104 is connected at the end of the yoke to hold the roller in contact with the edge of the disk. At 105 the cam rod 103 is pivoted to a crank arm 106 rigid with a pivot pin 107 journaled in bearings in the side of the housing 45 and this pin also carries the release lever 59 hereinbefore referred to.

Thus it will be obvious that as the rail is lifted, the cam disk is turned anti-clockwise until the roller 101 snaps into the notch 100 of the disk, stops the disk, pulls rod 103 and swings arm 106 to rock shaft 107 and swing detent 59 from beneath the arm 58 of the clutch lever. Under influence of its spring 57 the pawl 54 is swung into engagement with the notch 53 of the shaft 52 and the eccentric connecting rod is actuated to operate the shaft 64 and drag chain with its intermittent movement. A pawl 108 on shaft 107 is employed to engage and prevent back sliding of the sleeve 56 under influence of the spring 57 when power is disconnected.

By means of a wire 109 (Fig. 12) connected to the lever 106, a colored tile sorting-machine is also stopped whenever the drag link chain 70 stops. The other end of this wire is connected to a clutch mechanism for a sorting machine similar to that shown in Figures 20 and 21.

In Figures 10 and 12 a rod 110 is shown actuated from the ring 62 of the operating shaft for controlling the escapement mechanism of the base tile feed mechanism.

It will be understood that as many of the cross feed conveyers or drag-link chains may be used as is desired and while I have described the actuation and operation of only one chain, the devices for the other chains are of similar construction and operation. When a gate (or gates) 78 is opened, and a rail (or rails) 77 is elevated the drag link chain 70 (or chains) of the cross conveying mechanism, is started on its intermittent movement. The chain (or chains) stops automatically when all of the twelve rails are in lowered horizontal position and all gates closed.

The colored or contrasting tile, and the base tile are fed to the assembly drum, either by parallel conveyers, or by the main conveyers and the cross conveyers co-acting therewith, through main assembling chutes, under the control of devices which are adapted to make voids in the base pattern being fashioned on the drum, and to fill said voids with the contrasting or colored tile.

In placing rosettes, odd, contrasting, or colored tile on the paper sheets or backing I first form voids in the pattern which voids are created through the instrumentality of a rotary selector device actuated from the rotary assembling drum and located transversely of the main feed chutes which deliver the tile to the drum.

In Figure 7 the escapement mechanism J at the left is for forming the base pattern, and for creating voids in the pattern as it is being fashioned on the assembling drum K, and the escapement mechanism J' at the right is for filling or dropping colored tile in the voids thus created.

The primary motion for operating the main escapement mechanism J is derived from the assembling drum K through the annular series of pins or pegs 5 which project laterally therefrom. The escapement actuating device as illustrated, comprises a roller 111 journaled at the end of a rod 112 which is adjustably held in a block 113 pivoted by means of the pin 114 in the bracket plate 115 secured to a frame part 11 of the machine. As the assembling drum revolves the contact of these successive pins or pegs 5 with the roller, causes the pivot pin to rock and this rocking motion is transmitted through a crank arm 117 to the reciprocating link 118, an adjustable stop screw 119 being provided to limit the movement of the crank arm. The link 118 is pivotally connected to a rock arm 120 on the shaft 121 of the main escapement mechanism, which shaft extends across the machine and operates the escapements in various main assembling double chutes 122 and 123 for assembling the base tile and forming the voids in the assembled pattern.

The shaft 121 is provided with a longitudinally extending blade 124 for co-action with a lug 125 on each of a series of escapement levers 126, pivotally supported within the chute on an arm as 127 and 127' on the rock shafts 128 and 128', and stationary brackets 129 and 129' which extend across the chutes, are employed to prevent excessive downward movement of the escapement levers.

Springs 130 attached to the levers normally hold them with their lugs 125 projecting over and resting upon the blade 124.

The trip mechanism for the tile, operated by the escapement levers, comprises pivoted gates or detents 131 and 132 on the respective shafts 128 and 128', which gates are interposed in the path of movement of the tile and are operated by the pins 5 of the assembling drum, one pin for each two spaces, or tiles, that are deposited on the assembling drum.

The voids in the pattern are created by the use of a rotary selector roll 133 having pins 134 thereon arranged in suitable numbers and spaced in predetermined relationship on the roll which revolves with its shaft 135 once for each pattern assembled. The pins 134 correspond in number with the voids to be created in the pattern for the colored tile. The selector pins 134 contact with beveled heads 136 on the escapement levers and swing these levers away from the supporting blade 124.

Just at this time the primary motion transmitted from the roller 111 takes place for lifting the gates or detents 131 and 132 to release the tile of the base color in the main chutes. The escapement levers resting upon the blade 124 are lifted by the primary motion from roller 111 to open their gates or pivoted detents to permit flow of the base color tile. The escapement levers which have been withdrawn from the blade by the operation of the selector roll are not in position for contact and actuation by the blade, and therefore the gates controlled by these levers are not opened. Certain selected tile are thus retained in the chutes 122 and 123 by the unopened gates 131, 132, thus creating voids in the pattern on the assembling drum K.

As seen in Figs. 7 and 8 the mechanism J' for dropping the colored tile into the voids thus formed is quite similar in construction and operation to the void creating mechanism, but the escapement J' is actuated from an auxiliary selector roll 137 instead of from the assembling drum. The roll is journaled with its shaft 138 in suitable manner in the frame of the machine to revolve in synchronism with the selector roll 133. The auxiliary gates or detents 139 and 140 control the movement of the colored tile down through the chutes 141 and 142 and these gates are operated with a primary motion from the selector roll 137 through the escapement levers 143 and their shafts 144 and 145, and pivot arms 146. A supporting shaft 147 is provided with a suitable number of operating levers 148 which are swung on their pivots against tension of springs 149 by contact from the pins or pegs 150 on the selector roll 137 as the latter revolves anti-clockwise. The levers 148, which are pivoted at 151 to the escapement levers, thus lift the escapement levers to swing open the gates or detents 139 and 140 at predetermined times to permit the colored tile to flow down the chutes 141 and 142 to the assembling drum for incorporation in the pattern being formed thereon.

Additional mechanism for dropping different colored tile, complementary to the void-forming mechanism can be supplied as desired.

The selector roll 133 for creating the voids will have a number of pins 134 corresponding to the total number of pins 150 on the auxiliary selector rolls, and the pins of the auxiliary selector rolls are provided in number to correspond with the colors of the pattern being fashioned.

Having thus fully described my invention, what I claim as new and desire to secure by Letters Patent is—

1. In a tile assembling machine for composing definite patterns, means for creating voids in a base pattern, and means for filling said voids.

2. In a multi-color tile assembling machine, the combination with an assembling-carrier adapted to compose a definite pattern, of means for assembling a base section therein, means for creating voids in said section, and means for filling said voids.

3. In a multi-color tile assembling machine, the combination with a rotary assembling drum adapted to compose a definite pattern, of means for assembling a base section thereon, means for creating voids in said section, and means for filling said voids with tile.

4. In a multi-color tile assembling and pasting machine, the combination with a rotary assembling drum adapted to compose a definite pattern, of means for assembling a base section thereon, means for creating voids in said section, means for filling said voids, and means for fixing the completed pattern on a backing sheet.

5. In a multi-color tile assembling machine, an assembling-carrier and means thereon for composing a definite pattern, a main tile-feeding conveyer for forming a base section of the pattern, means for creating voids in the base section, and an auxiliary tile-feeding conveyer for filling said voids.

6. In a multi-color tile assembling and pasting machine, the combination with an assembling-carrier and means thereon for composing a definite pattern, of a main tile-feeding conveyer for forming a base section of the pattern and means for creating voids in said section, an auxiliary tile-feeding conveyer for filling said voids, and means for fixing the completed pattern on a backing sheet.

7. In a multi-color tile assembling machine, the combination with a rotary assembling drum and means for composing a definite pattern thereon, of a main tile-feeding conveyer for forming a base section on the drum, means for creating voids in said section, and an auxiliary tile-feeding conveyer for filling said voids.

8. In a multi-color tile assembling machine the combination with a rotary assembling drum adapted to compose a definite pattern and means for assembling tile thereon to form a base section, means for creating voids in the section, and means for depositing tile of contrasting color in said voids.

9. The combination with a rotary assembling drum adapted to compose a definite pattern, of a main tile-feeding device and means actuated by the drum for controlling said device, means co-operating with the feed device for creating voids in the pattern, and means for filling said voids.

10. In a multi-color tile assembling machine, the combination with a rotary drum adapted to compose a definite pattern, of a main tile-feeding conveyer for forming a base section of the pattern, means operated by the drum for controlling said conveyer, means co-acting with said operating means for creating voids in the section, and an auxiliary tile-feeding conveyer for filling said voids.

11. The combination with a rotary assembling drum, of a main tile-feeding device and an escapement mechanism for controlling the tile feed, means operated by the drum for controlling the escapement, means co-acting with the escapement for creating voids in the pattern, and an auxiliary tile-feeding conveyer for filling said voids.

12. In a tile assembling machine the combination with an assembling-carrier and a main tile-feeding conveyer, of an auxiliary tile-feeding conveyer, and separate means co-acting with said conveyers for stopping said conveyers at predetermined times.

13. The combination with an assembling carrier, a chute and a pivoted detent in the chute, of operating means actuated by movement of the carrier for intermittently moving the detent to release a tile.

14. The combination with an assembling carrier, a chute and a pivoted detent in the chute, of operating means including an escapement lever actuated by movement of the carrier, and means for selectively moving the lever to inoperative position to create a void in the tile assembly.

15. The combination with a tile assembling carrier, a chute and a pivoted detent in the chute, of operating means actuated by movement of the carrier for intermittently moving the detent to release a tile, and a rotary selector roll co-acting with the operating means to render said means inoperative for the purpose of forming a void in the assembly.

16. The combination with an assembling carrier, a chute and a pivoted detent therein, of operating means actuated by movement of the carrier including an escapement lever pivoted to the detent and a lifting blade for the lever, and means adapted to co-act with the lever for disconnecting the lever from the blade.

17. The combination with an assembling carrier, a chute and a pivoted detent therein, of operating means actuated by the movement of the carrier including an escapement lever pivoted to the detent and a lifting blade for the lever, a rotary selector roll, and pins on the roll adapted to engage the lever for disconnecting it from the blade.

18. The combination with an assembling chute for gravity fed tile, of a pivoted detent having an arm and a spring pressed lever pivoted to the arm, a lug on the lever, and an oscillatable blade adapted to engage said lug to cause release of a tile.

19. The combination with an assembling chute, of a pivoted detent having an arm and a spring pressed lever pivoted to the arm, a lug on the lever, an oscillatable blade adapted to engage said lug, and selectively operated means adapted to engage the lever and disconnect it from the blade.

20. The combination with an assembling chute, of a pivoted detent having an arm and a spring pressed lever pivoted to the arm, a lug on the lever, an oscillatable blade adapted to engage said lug, and a rotary selector roll having pins to engage the lever and disconnect it from the blade.

21. The combination with a plurality of complementary assembling chutes, of a pivoted detent lever in each chute and an escapement lever pivoted to each detent, means for actuating the levers to cause release of tiles, and selective means for rendering inoperative the levers.

22. The combination with a plurality of complementary assembling chutes, of a pivoted detent lever in each chute and an escapement lever pivoted to each detent, means for actuating the levers to cause release of tiles, and a selector roll having pins to engage said levers for rendering them inoperative.

23. The combination with a rotary assembling drum having a series of actuating pins, of a chute for tile and a detent in the chute, operating means for moving the detent to release a tile, a pivoted rod having a roller for engagement with the pins, and a link pivotally connecting the operating means and said rod.

24. The combination with an assembling carrier for tile, a storage delivery chute, feed mechanism in the chute adjacent the carrier and operated thereby, of means for supplying tile to a remote portion of the chute, and means operated by the carrier for controlling the supply of tile to the remote portion of the chute.

25. The combination with a rotary assembling drum, a storage chute, and gravity control feed mechanism in the chute adjacent the drum, of means for supplying tile to a remote portion of the chute, and means operated by the movement of the drum for controlling the supply of tile to the remote portion of the chute.

26. The combination with a rotary assembly drum for tile, a storage delivery chute, and gravity control feed mechanism in the chute, of a ball lever pivoted in the chute in the path of tile, means operated from the rotary drum for reciprocating the lever in the absence of a tile, tile supply mechanism, and means operated by the lever when in contact with a tile for stopping the supply.

27. The combination with a storage delivery chute for gravity-moving tile, of a support and, a laterally movable longitudinally reciprocable slide thereon, means for actuating the slide, a ball lever suspended from the slide to reciprocate in the path of movement of the tile when a tile is absent, tile supplying mechanism, and means actuated by the lever when a tile is in the path of the reciprocating lever for stopping the supply.

28. The combination with a rotary tile assembling drum, and a storage delivery chute for gravity-moving tile, of a support and a laterally movable longitudinally reciprocable slide thereon, operating linkage from the drum for reciprocating the slide, a ball lever suspended from the slide to reciprocate in the path of movement of the tile when a tile is absent, tile supplying mechanism, and means actuated by the lever when a tile is in the path of the lever for stopping the supply.

FRANK B. YINGLING.